United States Patent [19]

Matsuda

[11] 4,342,470
[45] Aug. 3, 1982

[54] FRAME STRUCTURE FOR A FORK LIFT TRUCK

[75] Inventor: Minoru Matsuda, Hamura, Japan

[73] Assignee: Nissan Motor Co., Ltd., Yokohama, Japan

[21] Appl. No.: 153,655

[22] Filed: May 27, 1980

[30] Foreign Application Priority Data

Mar. 29, 1979 [JP] Japan .................................. 54/65533

[51] Int. Cl.³ .............................................. B62D 21/12
[52] U.S. Cl. .................................. 280/785; 296/204
[58] Field of Search ............... 296/204; 280/781, 785, 280/111

[56] References Cited

U.S. PATENT DOCUMENTS

| | | | |
|---|---|---|---|
| 1,947,363 | 2/1934 | Shunk | 280/111 |
| 1,991,577 | 2/1935 | Remde | 280/111 |
| 2,750,199 | 6/1956 | Hart | 280/111 |
| 2,819,909 | 1/1958 | Calundan | 280/111 |

FOREIGN PATENT DOCUMENTS 2110761 9/1972 Fed. Rep. of Germany .
54-319 1/1979 Japan ................................. 280/781
1329805 9/1973 United Kingdom .

*Primary Examiner*—Joseph F. Peters, Jr.
*Assistant Examiner*—Ross Weaver
*Attorney, Agent, or Firm*—James C. Wray

[57] ABSTRACT

Frame structure for a fork lift truck includes a standardized steering axle assembly provided with a pair of longitudinally spaced pivots, which define a longitudinal swing axis of the axle assembly. The frame structure comprises a rigid rear frame sub-assembly including a horizontal plate member provided on its lower surface with a pair of projections defining recesses for receiving the pivots of the axle assembly. The horizontal plate member is integral with a pair of forwardly projecting mounting plate members whose front end portions are longitudinally adjusted along side surfaces of box section members provided for side panels of the frame structure, and then welded to the box section members. The rear frame sub-assembly is standardized and can be used to manufacture various types of frame structures having different wheel bases.

2 Claims, 8 Drawing Figures

FRAME STRUCTURE FOR A FORK LIFT TRUCK

BACKGROUND OF THE INVENTION

1. Field of the Invention

The present invention relates to a frame structure of a fork lift truck including a steering axle assembly provided with a pair of pivots longitudinally spaced from each other by a given distance and defining a longitudinal axis about which steering axles are adapted to swing.

2. Description of Prior Art

Conventional frame structure for such a fork lift truck will be explained with reference to FIGS. 1 to 3. The rear frame structure 1 includes a horizontal plate member 3 provided on its lower surface with longitudinally spaced projections 2 which define recesses for receiving the pivots of the steering axle assembly. A rear plate member 4 is secured to the upper surface of the horizontal plate member 3 and projected therefrom generally perpendicularly. Mounting plate members 5 are provided whose rear ends 6 are secured to the rear plate member 4. The mounting plate members are further secured on their lower edges to the horizontal plate member 3. Longitudinally extending side panels 7 on their rear ends 8 are secured to the side edges of the rear plate member 4. The side panels 7 are formed with lower surfaces 10 to which a rear cross member 11 is secured. The front ends 9 of the mounting plate members 5 as well as the front end of the horizontal plate member 3 are welded to the rear surface of the cross member 11. A box section member 12 is secured to the lower surface of the side panel 7, and to the cross member 11 on its rear end. A cover 13 is pivotally mounted to the box section member 12 by a hinge, not shown, so as to be opened or closed. The cover is held by a locking means, not shown, in contact with, or near a shoulder portion 14 of the side panel. A battery assembly 15 is placed on the lower portion of the side panel 7.

When various types of fork lift trucks having different wheel bases are to be manufactured by using a standardized steering axle assembly of the type mentioned above, the position of the projections 2 for mounting the axle assembly has to be adjusted longitudinally of the frame structure. However, since the front ends of the horizontal plate member 3 and of the mounting plate members 5 are brought into abutting engagement with, and welded to the rear cross member 11, at the time of assembling the frame structure, the position of those members cannot be adjusted longitudinally. Thus, the position of the mounting projections 2 has to be adjusted longitudinally with respect to the horizontal plate member 3 for each type of the fork lift truck. This means that various types of assembly jigs have to be prepared, which require a substantial expense. Moreover, since the members forming the rear portion of the frame structure, including the mounting projections 2, cannot be integrated into a standardized assembly which may be used to any types of fork lift trucks, assembling works of the frame structure cannot readily be simplified.

SUMMARY OF THE INVENTION

An object of the present invention is to provide an improved frame structure which, during the assembling works, is capable of longitudinally adjusting the position of the horizontal plate member and the mounting plate members, allowing standardization of the rear frame member, simplification of the assembling works and reduction of the required cost.

According to the present invention, a pair of the longitudinal side panels are respectively provided with means each defining a longitudinal side surface to which front portion of the respective mounting plate member is secured. The mounting plate members, together with the horizontal plate member, form a rigid rear frame sub-assembly of which the longitudinal position may be adjusted along the side surfaces of said means of the side panels.

DETAILED DESCRIPTION OF A PREFERRED EMBODIMENT

Figure 1:
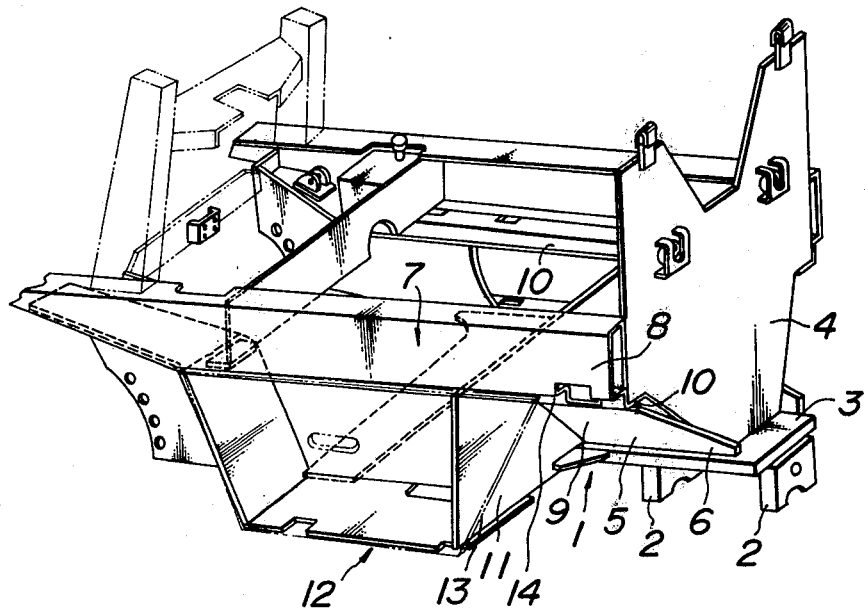
FIG. 1 is a perspective view of a conventional frame structure of a fork lift truck.
Figure 2:
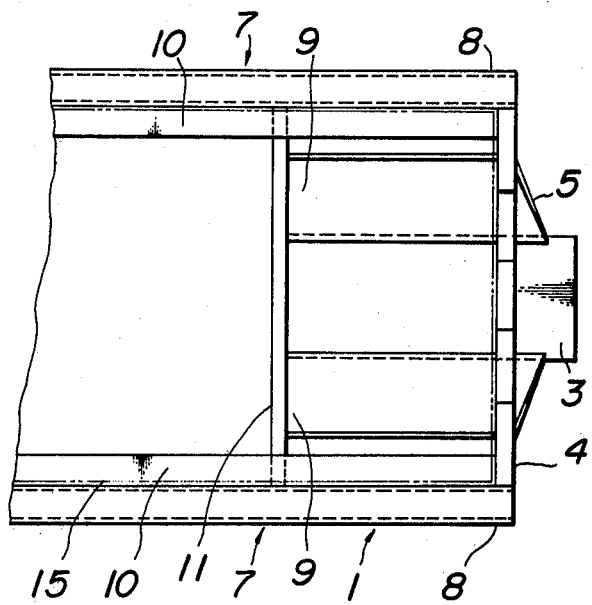
FIGS. 2 and 3 are plan view and rear view, respectively, of the rear portion of the frame structure shown in FIG. 1.
Figure 3:
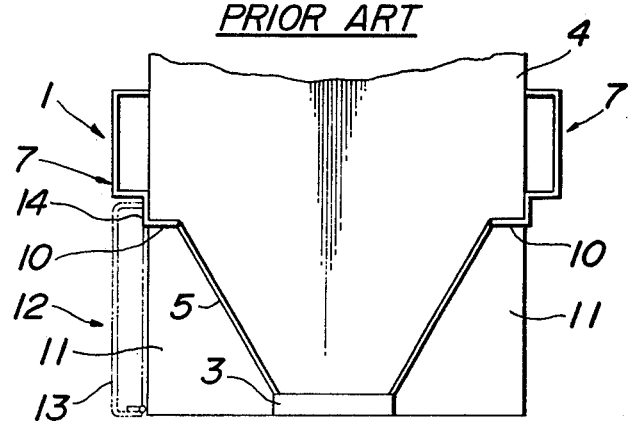
Figure 4:
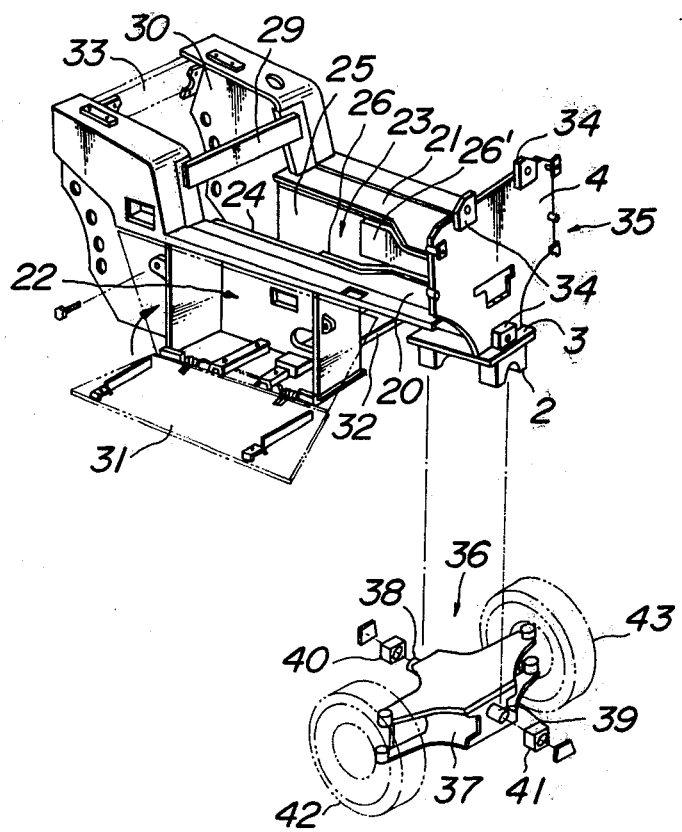
FIG. 4 is a perspective view of the frame structure according to a preferred embodiment of the present invention.
Figure 5:
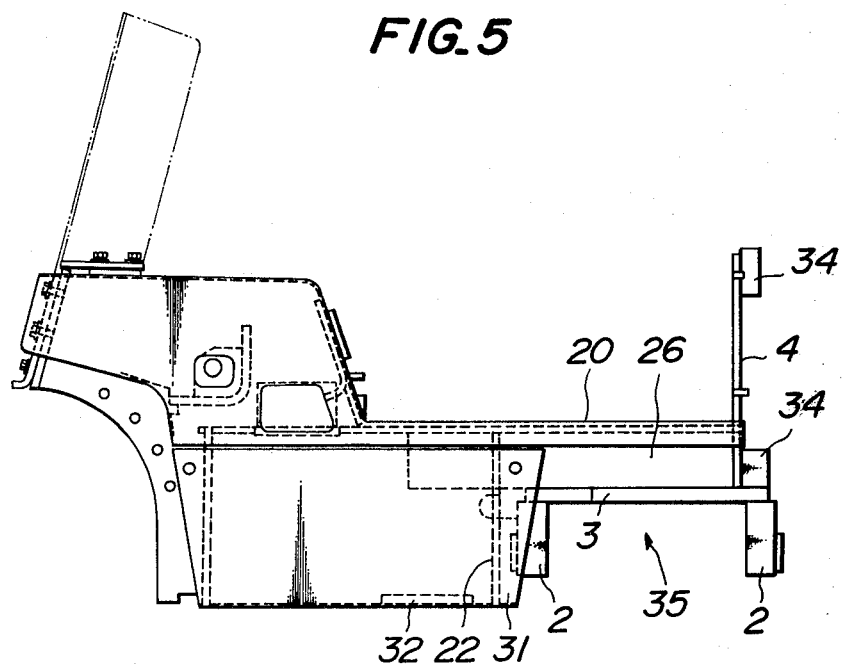
FIGS. 5, 6 and 7 are side view, plan view and rear view of the frame structure shown in FIG. 4.
Figure 6:
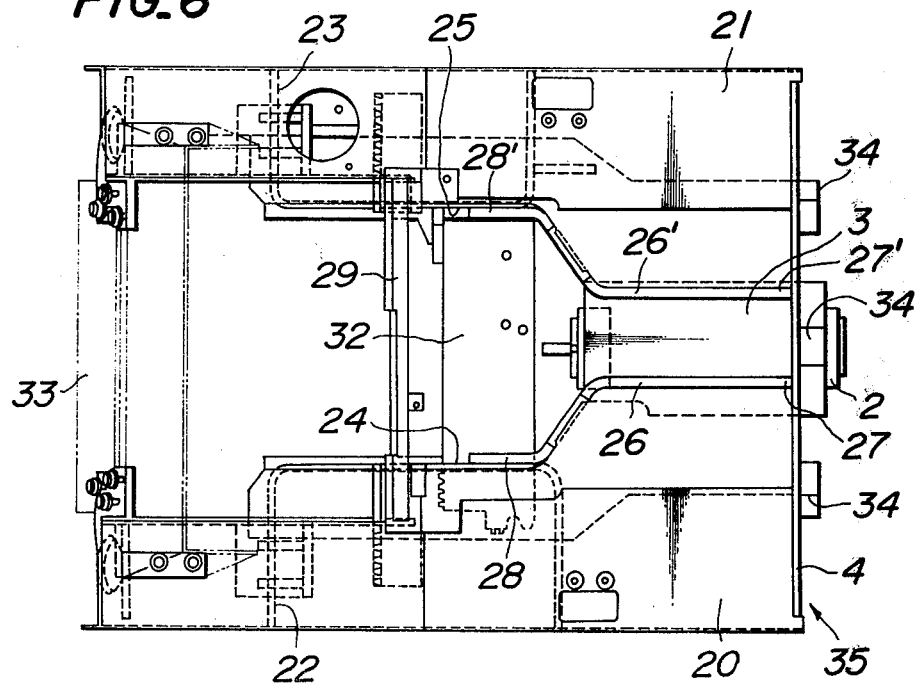

Referring now to FIGS. 4 to 8, the same reference numerals with those used in FIGS. 1 to 3 denote the same or equivalent parts, which are not explained for the sake of simplicity.

According to the present invention, the frame structure includes side panels 20, 21 which are arranged symmetrically on left and right sides of the structure. The side panels 20, 21 are provided with inner surfaces to which box section members 22, 23 are secured. The box section members 22, 23 include inner side portions 24, 25 which extend generally longitudinally. A rear frame sub-assembly 35 includes the horizontal plate member 3, the rear plate member 4 and a pair of mounting plate members 26, 26'. The mounting plate members 26, 26' are secured on the lower edges of the rear portions 27, 27' to the upper surface of the horizontal plate member 3 and, on the rear ends, to the front surface of the rear plate member to form a rigidly integrated unit. The rear portions of the mounting plate members 26, 26' are bent inwardly to prevent interference of the members 26, 26' with the rear steering wheels. The rear frame sub-assembly further includes a pair of longitudinally spaced mounting projections 2 which are secured to the lower surface of the horizontal plate member 3.

At the time of manufacturing a frame structure for a fork lift truck having a desired wheel base, the rear frame sub-assembly 35, according to the present invention, is mounted in place in the following manner. At first, by using an appropriate jig, the position of the sub-assembly 35 is adjusted forwardly or rearwardly with respect to the side panels 20, 21 with the side edges of the rear plate member sliding along the rear end portions 27, 27' of the side panels 20, 21. In the adjusted position of the sub-assembly 35, the front ends 28, 28' of the mounting plate members 26, 26' are welded to the inner side portions 24, 25 of the box section members 22, 23 and the rear ends of the side panels 20, 21 are welded to the side edges of the rear plate member 4.

Figure 7:
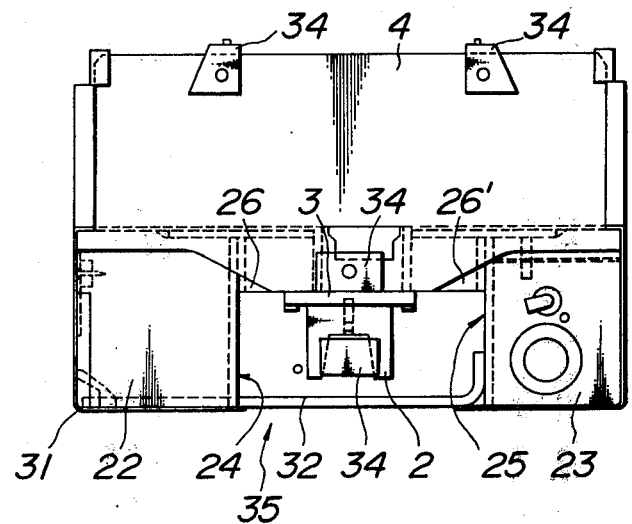
Figure 8:
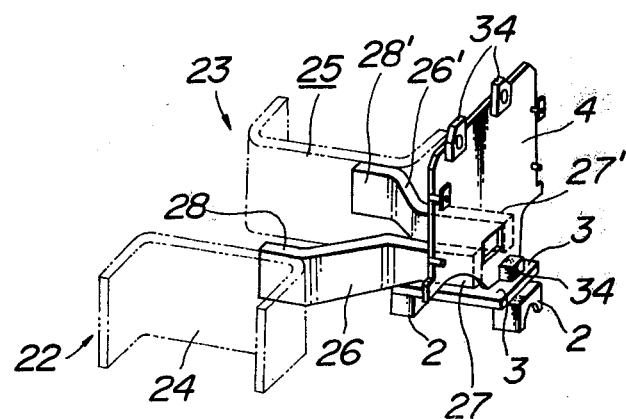
FIG. 8 is a perspective view of the rear frame sub-assembly shown in FIGS. 4 to 7.

As shown in FIG. 7, a rear steering axle assembly 36 includes an axle center member 37 which is provided with longitudinally alligned pivots 38, 39 secured to the front and rear sides of the member 37. The pivots 38, 39 are enclosed by rubber bushes 41, 42 and received in the recesses formed on the lower surfaces of the mounting projections 2. Steering wheels 42, 43 are supported by the center member 37 through axle spindles, not shown. Steering linkage, which is not shown, is accommodated in the center member 37.

Further shown in the drawings are an upper cross member 29, a drive axle mounting plate 30, a cover 31 for closing a receptacle formed by one of the box section members 22 to accommodate waste or tools, a center cross member 32 bridged between the box section members 22, 23, a front cross member 33 and counter weight mounting brackets 34 secured to the rear plate member 4 and the horizontal plate member 3. In the embodiment shown, the other box section member 23 is used to form an oil tank.

With the above structure of the present invention, frame structures for various types of fork lift trucks having different wheel bases and provided with standardized steering axle assembly can be manufactured by using standardized rear frame sub-assemblies. An assembling jig which allows the required longitudinal positioning of the rear frame sub-assembly eliminates use of individual jigs corresponding to the desired wheel bases. Thus, assembling works of the frame structures can be simplified and the required cost is reduced. Since the rear frame sub-assembly can be mounted without the conventional rear cross member 11, the cross member may be dispensed with to provide a large space under the battery assembly 15 and improve the maintainance operability.

What is claimed is:

1. A frame structure of a fork lift truck including a steering axle assembly provided with a pair of longitudinally spaced pivots defining a longitudinal axis about which steering wheels are adapted to swing, the frame structure comprising a horizontal plate member provided with means to define a pair of recesses to accommodate therein the pivots of the steering axle assembly, a pair of mounting plate members having rear portions secured on respective lower edge to the upper surface of the horizontal plate member, respectively, to form a rear frame sub-assembly, a pair of longitudinal side panels respectively provided with means to define a longitudinally extending vertical side surface to which front portion of the respective mounting plate member is secured, and further including a rear plate member secured to the upper surface of the horizontal plate member and projected therefrom generally perpendicularly, rear ends of the mounting plate members being secured to the front surface of the rear plate member and rear ends of the side panels being secured to the side edges of the rear plate member.

2. The structure as claimed in claim 1, wherein said means to define the vertical side surface comprises a box section member whose inner space serves to provide a receptacle for accommodating therein an oil tank, waste or tools.

* * * * *